United States Patent [19]

Prat

[11] 4,335,499
[45] Jun. 22, 1982

[54] DEVICE FOR RAPID CHANGING OF TOOLS, PARTICULARLY ON LARGE-SCALE MACHINES

[75] Inventor: Serge Prat, Bures-sur-Yvette, France

[73] Assignee: Regie Nationale des Usines Renault, Boulogne-Billancourt, France

[21] Appl. No.: 120,764

[22] Filed: Feb. 12, 1980

[30] Foreign Application Priority Data

Feb. 14, 1979 [FR] France .............................. 79 03775

[51] Int. Cl.³ .......................................... B23Q 3/155
[52] U.S. Cl. ......................................... 29/568; 29/14;
29/33 P; 198/345; 409/287
[58] Field of Search ............ 29/568, 26 A, 1 A, 33 P, 29/563; 198/345; 409/287

[56] References Cited

U.S. PATENT DOCUMENTS

| | | | |
|---|---|---|---|
| 2,788,564 | 4/1957 | Waldrich | 29/1 A |
| 3,113,767 | 12/1963 | Halberstadt | 198/345 X |
| 3,343,244 | 9/1967 | Baublys et al. | 29/33 P |
| 3,930,301 | 1/1976 | Wagner | 29/568 |
| 4,110,898 | 9/1978 | Yamaoka et al. | 29/568 |

FOREIGN PATENT DOCUMENTS

| | | |
|---|---|---|
| 2212875 | 10/1973 | Fed. Rep. of Germany . |
| 2257151 | 5/1974 | Fed. Rep. of Germany . |
| 2260914 | 6/1974 | Fed. Rep. of Germany . |
| 2107710 | 5/1972 | France . |
| 2243778 | 4/1975 | France . |
| 2250957 | 6/1975 | France . |
| 2302165 | 9/1976 | France . |
| 342528 | 8/1935 | United Kingdom . |

Primary Examiner—Z. R. Bilinsky
Attorney, Agent, or Firm—Oblon, Fisher, Spivak, McClelland & Maier

[57] ABSTRACT

A combining mechanical placement mechanism which includes hydraulic jacks and stops with automatic clamping at multiple points via tie rods provided with elastic washers, so as to fasten to the slide of the machine the tool-holder equipped with its cutting tools, or to mount a cutting tool of sizable portions to the slide of the machine, without intermediary tool-holder.

5 Claims, 10 Drawing Figures

DEVICE FOR RAPID CHANGING OF TOOLS, PARTICULARLY ON LARGE-SCALE MACHINES

BACKGROUND OF THE INVENTION

1. Field of the Invention

This invention, concerns the positioning and attachment on machines of tools or tool-holders, particularly when their dimensions are large and they have a substantial mass, as is the case for external vertical or horizontal staple presses.

2. Description of the Prior Art

Attachment is usually carried out by means of bolting, using several dozen bolts and plugs in T-channels made in accordance with standard DIN No. 650. This method of attachment does not allow for a rapid change of tools and tool-holders and thus results in long periods of down time for the machine, which in the case of a highly productive machine represents a substantial reduction in the machine's output, thereby increasing the cost price for machining the item under consideration in the operation. Moreover, this conventional solution requires human intervention in the direct vicinity of the cutting edges of the cutting tools in order to manipulate sizable masses into positions which are often unstable and uncomfortable. This results in the threat of occurrence of accidents.

SUMMARY OF THE INVENTION

The object of the invention is to eliminate the foregoing drawbacks by reducing the down time of the machines attributable to changes in tool-holders and cutting tools and by limiting the direct human intervention, thereby reducing the risk of accidents.

The invention consists of the combination of mechanical positioning by means of hydraulic jacks and stops and automatic clamping at multiple points by means of tie-rods equipped with elastic washers of a tool-holder equipped with its cutting tools to a slide of the machine, or to mount a cutting tool of sizable proportions directly to the slide of the machine without any intermediary tool-holder.

Various other objects, features and attendant advantages of the present invention will be more fully appreciated as the same becomes better understood by reference to the following detailed description when considered in connection with the accompanying drawings in which like reference characters designate like or corresponding parts throughout the several views, and wherein:

DETAILED DESCRIPTION OF THE PREFERRED EMBODIMENTS

Figure 1:
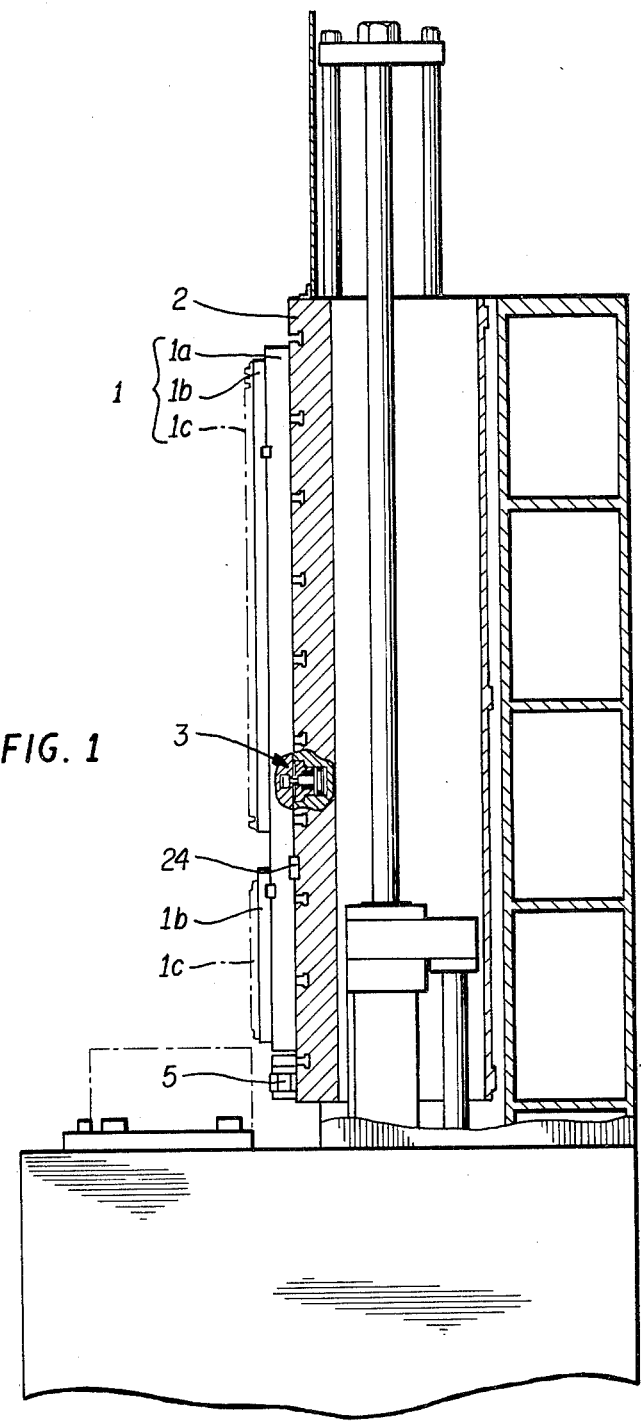
FIG. 1 is a vertical cross sectional view of the machine of the present invention.

FIG. 1 shows a unit 1, consisting of an intermediary plate 1a, tool-holders, 1b, and cutting tools 1c, which is to be mounted on and dismounted from the slide 2 of the machine when the machine is stopped for changes of tools or for changes in the series of items to be machined. In this figure, a partial cross sectional view shows one of the multiple clamping points 3 for fastening the unit 1 to the slide 2.

Figure 2:
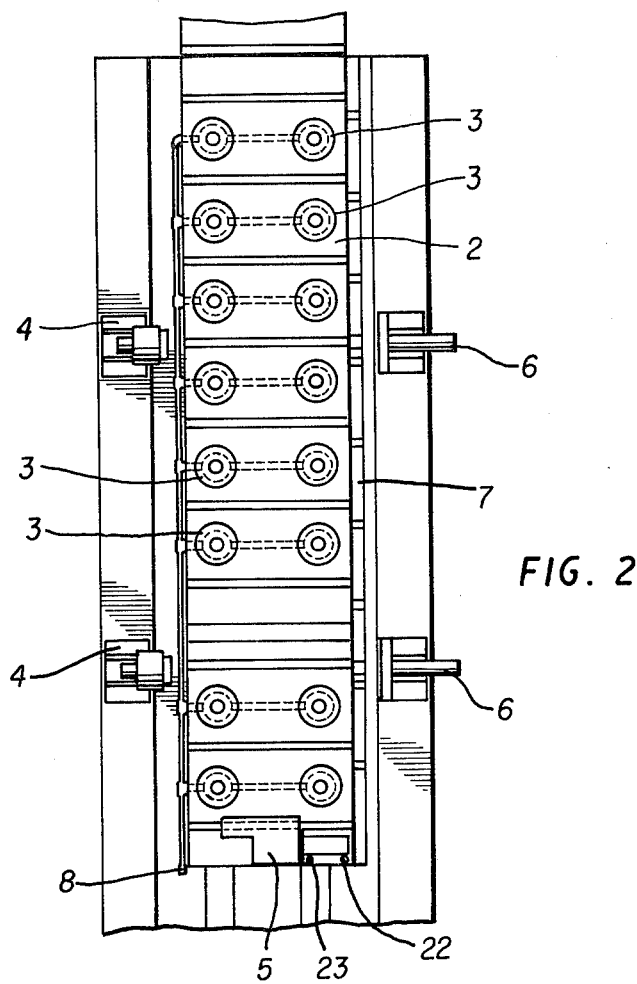
FIGS. 2 and 3 are frontal views, from above and from the same level, respectively, of the machine shown in FIG. 1.

FIG. 2 shows the distribution of the various multiple clamping points 3 as well as of the stops 4 used for prepositioning and positioning horizontally of the tool holder by means of second hydraulic jacks to 30 and the positioning stop 5 used for positioning in the vertical direction. Also visible are the disengaging jacks 6 used in the process of dismounting the tool-holders 1b. The simultaneous unclamping of the multiple locking points 3 is obtained hydraulically be means of a quick-fastening coupling 8 to a feed line, only after the slide has stopped.

Figure 3:
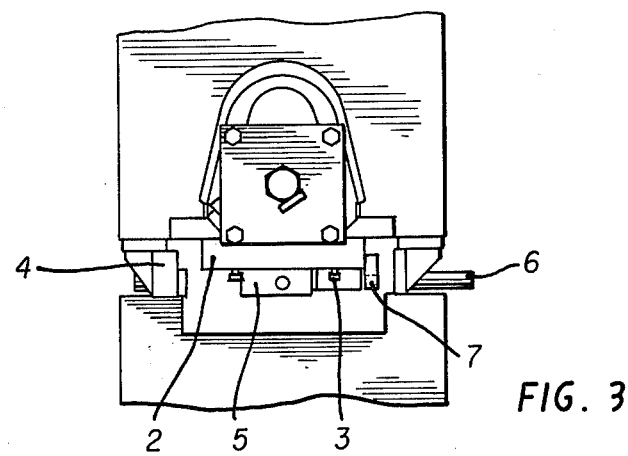

FIGS. 2 and 3 also show the truing-up edge 7 which forms one piece with or is attached to the slide 2 and against which the hydraulically controlled stops 4 position the tool-holders 1b.

Figure 4:
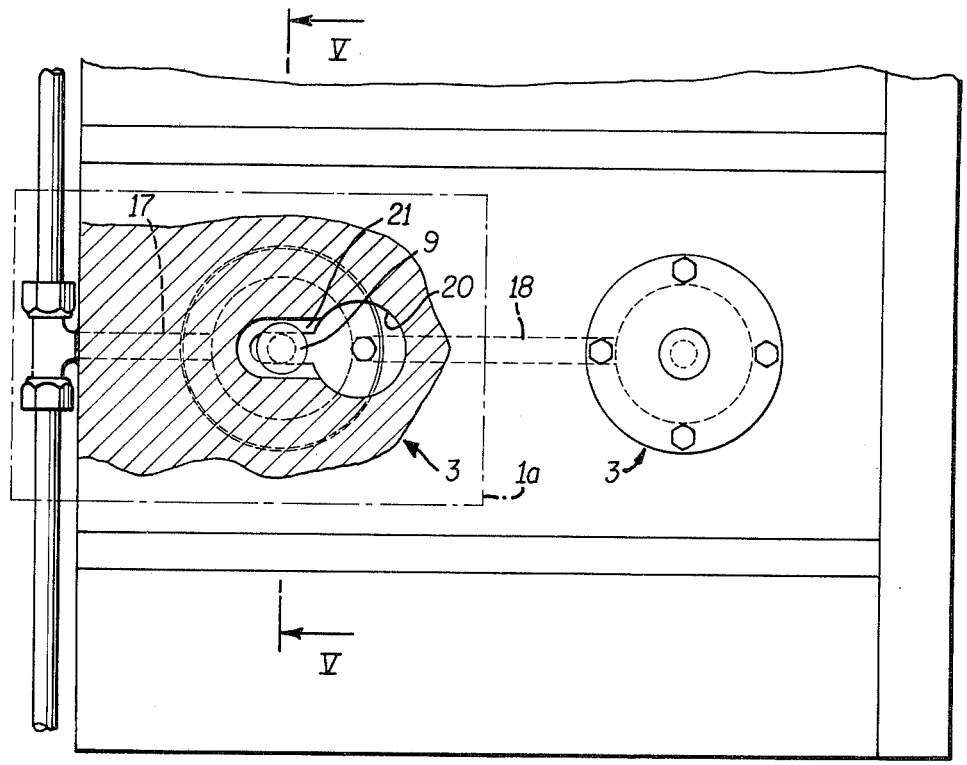
FIG. 4 is a partial view on a larger scale of a section of FIG. 2, including a partial cross sectional view.
Figure 5:
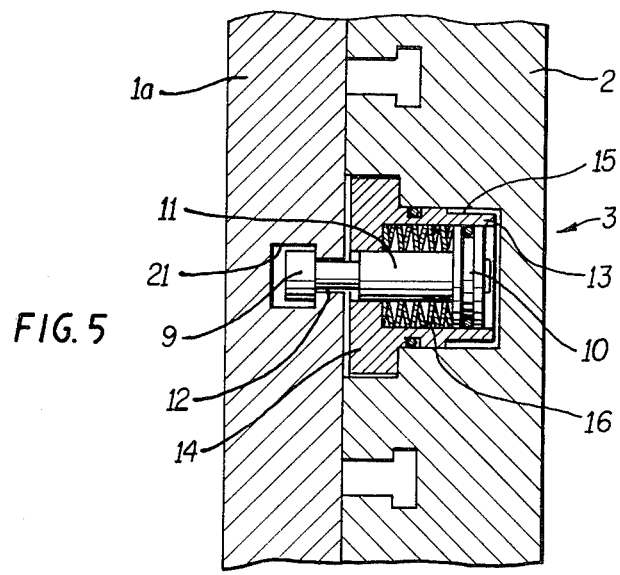
FIG. 5 is a vertical cross sectional view along line V—V of FIG. 4.
Figure 6:
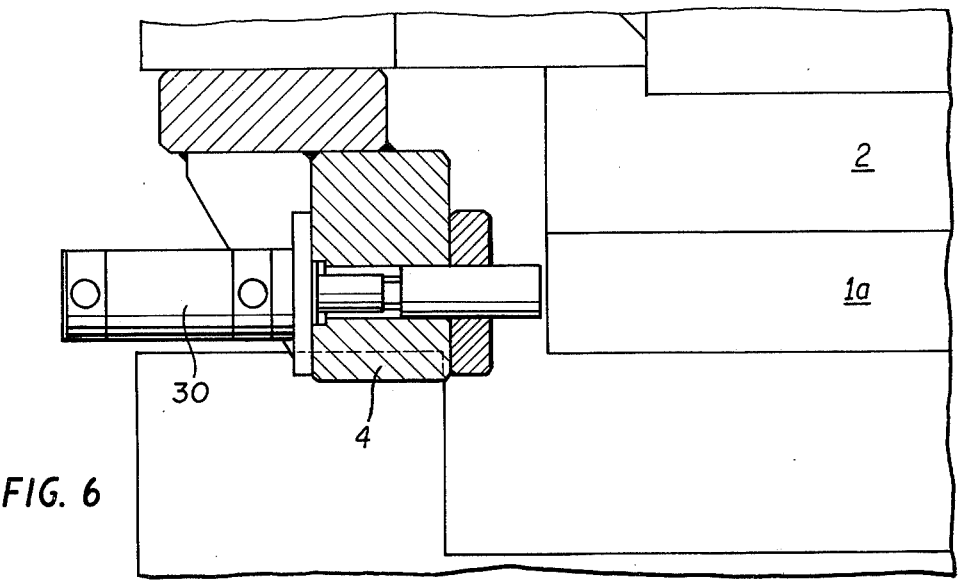
FIG. 6 is a horizontal cross sectional view on a larger scale of one of the horizontal prepositioning stops.

FIGS. 4 and 5 show in detail how the clamping and unclamping devices 3 are constructed in accordance with the present invention. Each of these devices, of which there are sixteen in the example selected, consists of a head 9 which forms one piece with a hydraulic piston 10 via a piston rod 11 which is separated from the head 9 by a groove 12. The piston 10 slides in a sealed environment inside the cylinder sleeve 13 of a cylinder head 14 which is screwed into the opening of a hole 15 machined into the slide 2. A small stack of elastic washers 16 disposed between the piston 10 and the cylinder 14 provides the necessary clamping force and the bottom portion of the cylinder, located between the piston 10 and the bottom of the hole 15, is fed with oil through connecting holes 17 or 18 (FIG. 4) with the help of an arrangement shown in FIG. 5 and located at the periphery of the sleeve 13. Small tubes or channels 19 connect these various connecting holes to the coupling 8.

Moreover, in the intermediary plate 1a and at the location corresponding to each of the clamping devices 3, a cylindrical hole 20 is machined to allow for the free axial passage of the head 9, this being accomplished to provide a great deal of tolerance. On one side of the hole 20, the same side for each hole, which in the case of the FIG. 5 showing the example selected is the left side, a short T-channel 21 is machined which opens into the hole 20 and allows for the hookup of the head 9.

The two horizontal prepositioning stops 4 and the vertical positioning stop 5 are arranged such that the first two on the fixed framework of the machine are disposed opposite the high position of the slide 2, the latter being disposed on the same slide. Accordingly, when the intermediary plate 1a abuts the truing-up edge 7, all the clamping heads 9 are hooked into their respective channels 21 as represented in FIGS. 4 and 5.

To completely change the unit 1 and replace it by a new unit, the first step is to move the slide 2 of the machine to its high position, place the unit 1 in a sling to support it later by a piece of handling equipment of some kind, and to then connect the hydraulic system by means of coupler 8 so as to communicate the necessary oil pressure for simultaneous unclamping of all the heads 9. The unit 1 then rests against its positioning stop 5.

Figure 7:
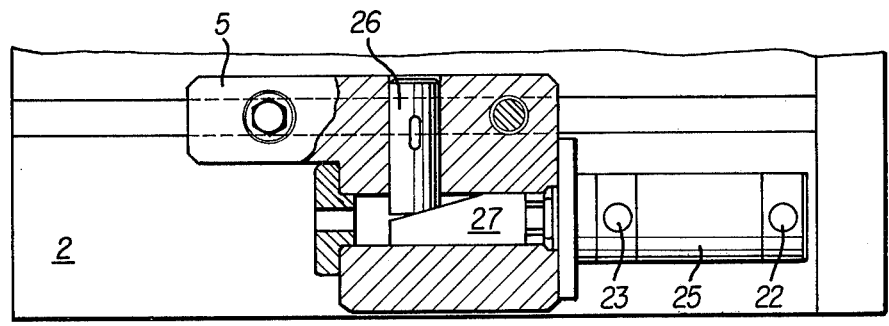
FIG. 7 is a vertical cross sectional view of the vertical prepositioning stop.
Figure 8:
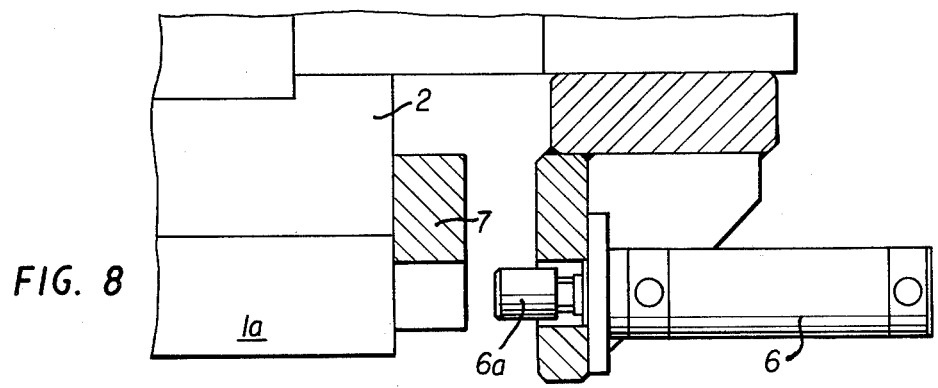
FIG. 8 is a horizontal cross sectional view of one of the unfastening devices.

Instructions are then given to advance the disengaging jacks 6 on the stops which are attached to the frame of the machine in such a way that the unit 1, pushed to the left in the Figures by the jack shafts 6a, is moved until it comes up against the prepositioning stops 4, which consequently positions the holes 20 opposite the heads 9. The unit 1 is then freed and can be carried away by a piece of handling equipment after the jack shafts 6a or push rods of the jacks 6 have been withdrawn. A new unit 1 is then introduced by bringing it up against stops 4 and on stop 5. After connecting the hydraulic jack 25 of stop 5 by means of its quick couplers 22 and 23 (FIGS. 2 and 7), it is made to advance so as to bring the unit 1 up against sliding or driving key 24 shown in FIG. 1. This movement calls for a certain degree of precision, which is why stop 5 has a first jack 25 which acts against a vertical pushrod 26 through a reduction gearing in the corner 27. Then the jacks 30 or prepositioning stop 4 which have a permanent hydraulic tie-in to the machine, are commanded to bring the unit 1 against the truing-up edge 7 by sliding along the horizontal key 24. The unit 1 is then in the correct position. Clamping of the unit 1 to the slide 2 simultaneously at all the multiple points 3 is ensured by simply disconnecting the coupler 8. Once clamping has been completed, the jacks at stops 4 and 5 are disengaged and the couplers 22 and 23 are disconnected. The machine is then once again ready to operate.

This device makes it possible to eliminate almost all the manual operations other than the hydraulic couplings 8, 22, 23. Consequently, all the corresponding risks are eliminated.

Figure 9:
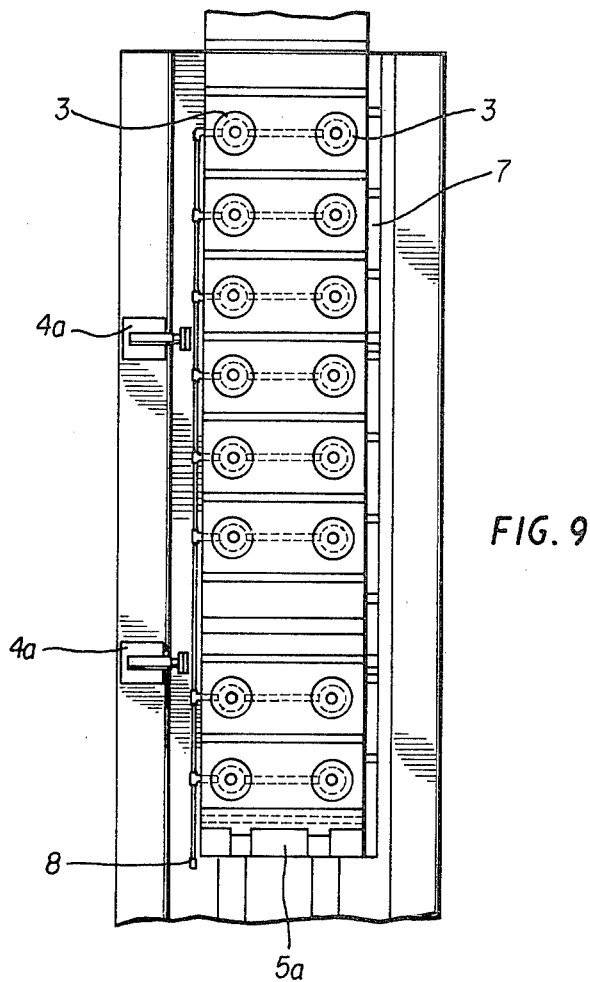
FIGS. 9 and 10 are views corresponding to FIGS. 2 and 3 in the event that manual positioning is utilized.
Figure 10:
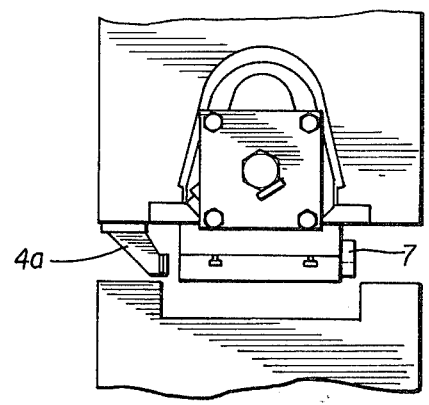

However, in the event that the tool-holder used is of but moderate weight and bulkiness, making it easier to handle, the prepositioning stops 4 and the positioning stop 5 may be made without jacks and, as a result, replaced by fixed angle irons 4a and 5a. The disassembly stops could be eliminated as in the variant method of manufacture represented in FIGS. 9 and 10. In this case, the horizontal engaging and disengaging shifting of the clamping heads is effected by manual action and only the multiple points clamping is still automatic.

One possible variant is also to place the clamping blocks 3 in the intermediary plate 1a, or in the toolholder 1b if it is directly mounted on the slide 2, and the hook-up channels 21 are then placed on the slide. Finally, the clamping device may be used for attaching equipment to be machined on any machine tables, regardless of their orientation, for example, when it is necessary to change the machining assembly for a work involving clusters of different types of objects to be machined. Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the united states is:

1. A device for rapidly positioning and securing a tool holder plate onto a machine slide comprising:
    a plurality of clamping units;
    a clamping head operatively associated with each of said clamping units;
    elastic biasing means for effecting a clamping force disposed within each of said clamping units;
    said machine slide having a plurality of cavities formed therein for accommodating each of said clamping units, respectively;
    said tool holder plate having a plurality of T-channels formed therein for accommodating each said clamping head such that said T-channels are disposed within a plane parallel with said machine slide;
    said tool holder plate further comprising a plurality of openings formed therein and communicating with said T-channels, said openings having widths wider than said clamping heads for facilitating insertion and removal of said clamping heads into and out of said T-channels, said openings being coplanar with said tool holder plate;
    a cylinder mounted within each of said cavities in said machine slide;
    a clamping piston secured to each said clamping head and movably mounted within said cylinder such that activation of said cylinder via fluid pressure effects colinear movement of said clamping head with said piston in a direction perpendicular to said tool holder plate such that engagement and disengagement between said clamping head and said T-channel are effected by sliding said tool holder plate over said machine slide along said T-channels;
    at least one positioning stop means operatively associated with said tool holder plate for aligning in a first direction the axes of said T-channels with said clamping heads;
    at least one prepositioning stop means operatively associated with said tool holder plate such that abutment of said tool holder plate with said prepositioning stop means effects coaxial alignment in a second direction perpendicular to said first direction of each said clamping head with each corresponding said opening in said tool holder plate for allowing unobstructed insertion and removal of each said clamping head through each of said openings in said tool holder plate; and
    at least one truing-up edge member operatively associated with said machine slide such that abutment of said tool holder plate with said truing-up edge member positions each said clamping head within said T-channels.

2. A device for rapidly positioning and securing a tool holder plate onto a machine slide comprising:
    a plurality of clamping units;
    a clamping head operatively associated with each of said clamping units;
    elastic biasing means for effecting a clamping force disposed within each of said clamping units;
    said tool holder having a plurality of cavities formed therein for accomodating each of said clamping units, respectively;
    said machine slide having a plurality of T-channels formed therein for accommodating each said clamping head such that said T-channels are disposed within a plane parallel with said machine slide;
    said machine slide further comprising a plurality of openings formed therein and communicating with said T-channels, said openings having widths wider than said clamping heads for facilitating insertion and removal of said clamping heads into and out of said T-channels, said openings being coplanar with said machine slide.

a cylinder mounted within each of said cavities in said tool holder;

a clamping piston secured to each said clamping head and movably mounted within said cylinder such that activation of said cylinder via fluid pressure effects colinear movement of said clamping head with said piston in a direction perpendicular to said machine slide such that engagement and disengagement between said clamping head and said T-channel are effected by sliding said tool holder plate over said machine slide along said T-channels;

at least one positioning stop means operatively associated with said tool holder plate for aligning in a first direction the axes of said T-channels with said clamping heads;

at least one prepositioning stop means operatively associated with said tool holder plate such that abutment of said tool holder plate with said prepositioning stop means effects coaxial alignment in a second direction perpendicular to said first direction of each said clamping head with each corresponding said opening in said machine slide for allowing unobstructed insertion and removal of each said clamping head through each of said openings in said machine slide; and at least one truing-up edge member operatively associated with said machine slide such that abutment of said tool holder plate with said truing-up edge member positions each said clamping head within said T-channel.

3. The device according to claims 1 or 2, further comprising:

a rectilinear sliding key operatively connected to said machine slide; and said at least one positioning stop member each further comprising at least one first jack wherein said first jack further comprises geared actuating means for movement of said tool holder plate into alignment with said machine slide to effect mutual engagement of said rectilinear sliding key and said tool holder plate.

4. A device according to claim 3 further comprising:

a second jack wherein said second jack comprises an integral part of each said at least one prepositioning stop means for pushing said tool holder plate toward and against said truing-up edge member by sliding said tool holder plate over said rectilinear sliding key and over said at least one positioning stop means; and at least one disengaging jack for pushing said tool holder plate away from said truing-up edge.

5. A device according to claim 4 further comprising:

push rod members operatively connected to said disengaging jacks;

channel members for permanent hydraulic connection of said second jack and said at least one disengaging jack; and coupling means for rapid temporary hydraulic connection of said first jack and said clamping units.

* * * * *